United States Patent [19]
Christian

[11] Patent Number: 5,804,001
[45] Date of Patent: Sep. 8, 1998

[54] SNOW CHAINS FOR VEHICLES

[76] Inventor: Joseph A. Christian, 592 John St., Peekshill, N.Y. 10566

[21] Appl. No.: 778,546

[22] Filed: Jan. 3, 1997

[51] Int. Cl.$^6$ .................................................. B60C 27/10
[52] U.S. Cl. ...................... 152/241; 152/213 A; 152/218
[58] Field of Search ............................. 152/213 A, 218, 152/241

[56] References Cited

U.S. PATENT DOCUMENTS

| | | | |
|---|---|---|---|
| 3,856,069 | 12/1974 | Giannone | 152/233 |
| 3,858,634 | 1/1975 | Giannone | 152/213 |
| 3,970,132 | 7/1976 | Gianonne | 152/233 |
| 4,185,674 | 1/1980 | Giannone | 152/218 |
| 4,392,521 | 7/1983 | Giannone | 152/218 |

Primary Examiner—Francis J. Lorin
Attorney, Agent, or Firm—Abelman,, Frayne & Schwab

[57] ABSTRACT

The vehicle tire chain structure is disclosed, which includes a plurality of cross chains which are arcuately spaced about the tire tread, and held in place by rope connectors, each of which are connected to the successive inboard and outboard ends of the cross chains. The assembly is held in place by an additional spreader rope, and its associated connecting elements, to facilitate the tightening of the assembly, and maintaining same in a taut condition during prolonged periods of use. The tire chain structure is assembled on the vehicle tire without jacking up or movement of the vehicle.

22 Claims, 7 Drawing Sheets

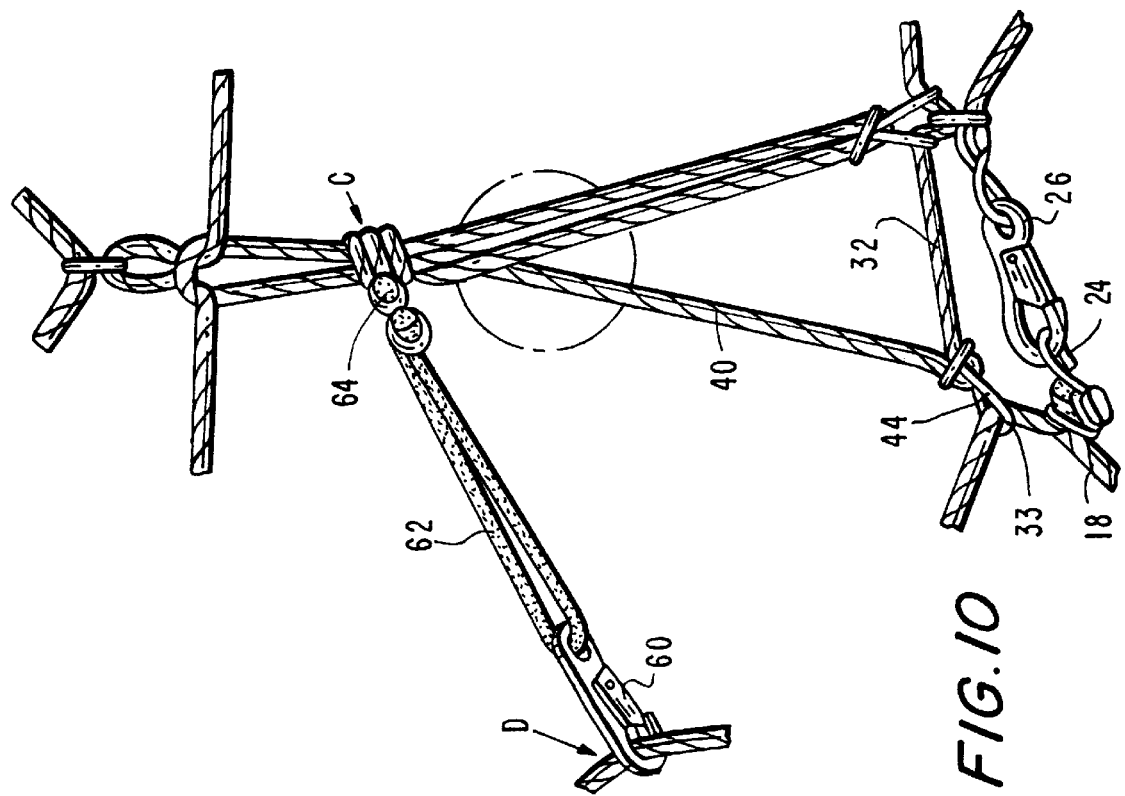
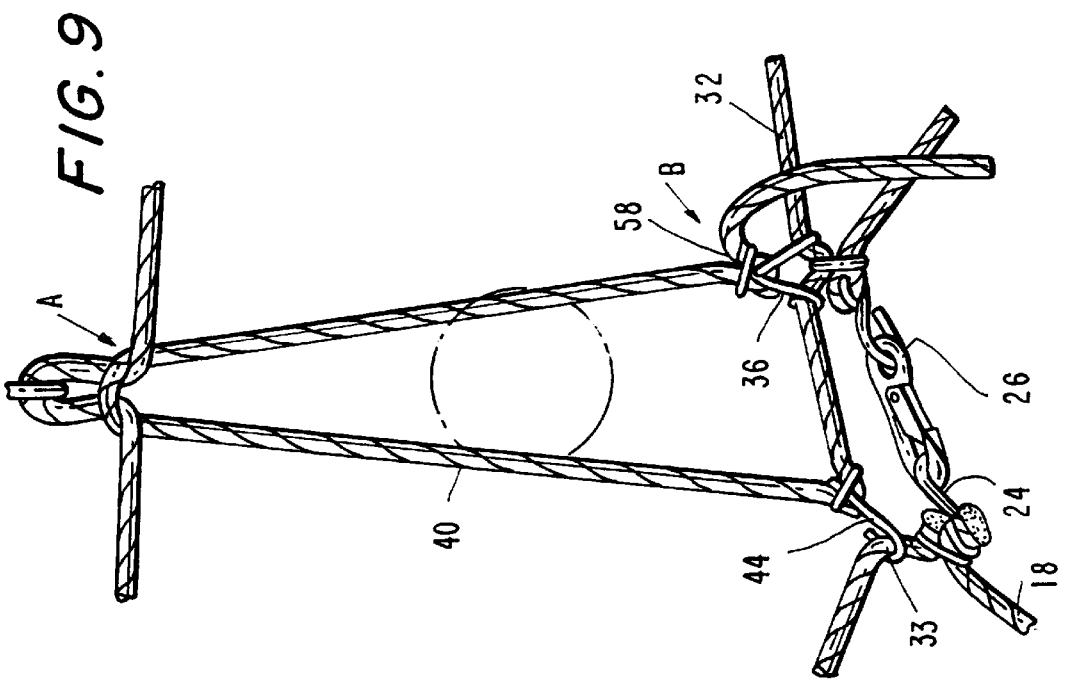

SNOW CHAINS FOR VEHICLES

FIELD OF INVENTION

This invention relates to vehicle tire chain structures which may be readily connected to the tires in order to provide additional traction during the occurrence of inclement weather. Preferably, the vehicle tire chain structure can be installed about the tire without the necessity of jacking the vehicle to raise the lower surface of the tire off the ground or move the vehicle. The tire chain structure includes a plurality of metal cross chains which are positioned across the tire at arcuately spaced locations. Each of the cross chains is connected to non-metallic rope connectors at its opposite ends, with the connection about the tire being tightened, and securably maintained by an additional non-metallic rope connector which can be readily manually tightened to place all the rope connectors and cross chains in a taut condition. Advantageously, the force to tighten the assembly is in a direction and sequence to facilitate manual application of the appropriate high forces. Further, various structural improvements have been made with respect to prior art chain structures to modify the chain configuration in accordance with the particular vehicle tire size, and to maintain a secure engagement therebetween during prolonged periods of use.

DESCRIPTION OF THE PRIOR ART

Various proposals have been made in the past for simplifying the mounting of tire chains on a vehicle tire. Such prior structures are disclosed in U.S. Pat. Nos. 4,392,521, 4,185,674, 3,970,132, 3,858,634, and 3,856,069. In particular, the present invention is an improvement over the structure shown in aforementioned U.S. Pat. Nos. 4,392,521 and 4,185,674, both of which include a plurality of metal cross chains having inboard and outboard ends for positioning across the tread of a tire at arcuately spaced locations to enhance tire traction. The inboard ends of the cross chains are connected to a non-metallic inboard rope connector, while the outboard ends of the cross chains are connected to a non-metallic outboard rope connector. Upon placement of the metal cross chains about the perimeter of the tire, and the connection of the opposed ends of the inboard and outboard rope connector, the assembly is then tightened by an additional spreader rope which is connected to the outboard rope connector. While this basic tire chain concept advantageously avoids the need to lift the tire off the ground surface during the placement of the chain thereabout, it has certain shortcomings with respect to (a) facilitating the application of appropriate tightening forces during the placement of the tire chain assembly on the vehicle tire, (b) maintaining these requisite forces during its prolonged periods of usage, and (c) enhancing the adjustability of the chain configuration in accordance with vehicle tire size.

It should be well appreciated that the tire chains must be placed upon the vehicle tire in a taut condition, and this relationship must be maintained during prolonged periods of chain usage. The loosening of the chain will result in a reduction in the requisite traction forces, annoying rattling and possible vehicle damage. Accordingly, it is most important that the installer be able to apply appropriate manual forces to establish the requisite taut condition. Accordingly, various modifications have been made to the spreader rope and its association with the other components of the tire chain structure to optimize the ability of the installer to readily apply the requisite manual forces.

One such improvement is the initial positioning of the tire chain structure about the vehicle tire such that the spreader rope is first tightened by pulling in a vertically upward direction. This is to be contrasted with the prior art which generally required the pulling of the spreader rope in a generally horizontal direction. It should be well appreciated that the installer should be able to readily exert more force by pulling the arms upward in the vertical direction than across the body in a generally horizontal direction while bending down to the tire.

Another improvement is the use of an intermediate securement of the spreader rope in the course of its sequential tightening so as to maintain a previously taut condition, as the remaining free end of the spreader rope continues to be engaged within the structure to complete the assembly.

A further improvement is to provide an elastic member at the free end of the spreader rope, which both facilitates the maximizing of the forces being applied, and assists in maintaining such forces during prolonged periods of use.

To facilitate the initial assembly of the tire chain structure about the tire, a connecting rod is provided to engage one of the inboard ends of the inboard rope connector, which will be behind the tire, and to manually bring it to the other inboard end, so as to then facilitate the connection of the two inboard rope connector ends.

To increase the integrity of the assembly, and in particular to prevent the parts from becoming decoupled during prolonged periods of use, the inboard, outboard, and spreader rope connectors all preferably include a spring-loaded closure member.

Recognizing the desirability of permitting an adjustment in the size of the vehicle tire chain structure, such that the assembly may be custom sized to the particular vehicle tire, means are provided for varying the length of each of the inboard and outboard rope connectors. Such adjustment means has included a plurality of metal collars at each of the connections to the cross chain. As shown in U.S. Pat. No. 4,392,521, each of the metal collars was of approximately 360 degrees, with its ends in butting relationship. Recognizing that the substantial forces exerted on the tire chain during use could result in the opening of such collars, in accordance with the present invention, each of these collars is clamped to its respective rope over a length which exceeds 360 degrees, to provide an overlapped length beyond the previous butt juncture of its ends.

To further assist in the placement of the tire chain structure about the vehicle tire, the three principal rope connectors (outboard, inboard and spreader) may be color-coded.

Accordingly, it is a primary object of the present invention to substantially facilitate the manner in which an adjustable size vehicle tire chain structure is manually placed over the vehicle tire.

A further object of the present invention is to provide such vehicle tire chain structure which may be more readily secured and maintained in a taut condition during both initial installation and in the course of prolonged use.

Another object of the present invention is to provide such an adjustable size vehicle tire chain structure in which the possibility of the assembly becoming loose during prolonged use is substantially reduced.

These as well as other objects of the present invention will become apparent upon consideration of the following description and drawings.

BRIEF DESCRIPTION OF THE DRAWINGS

FIGS. 4 through 10 sequentially showing the initial placement, tightening and final assembly of the tire chain structure about the vehicle tire.

Figure 1:
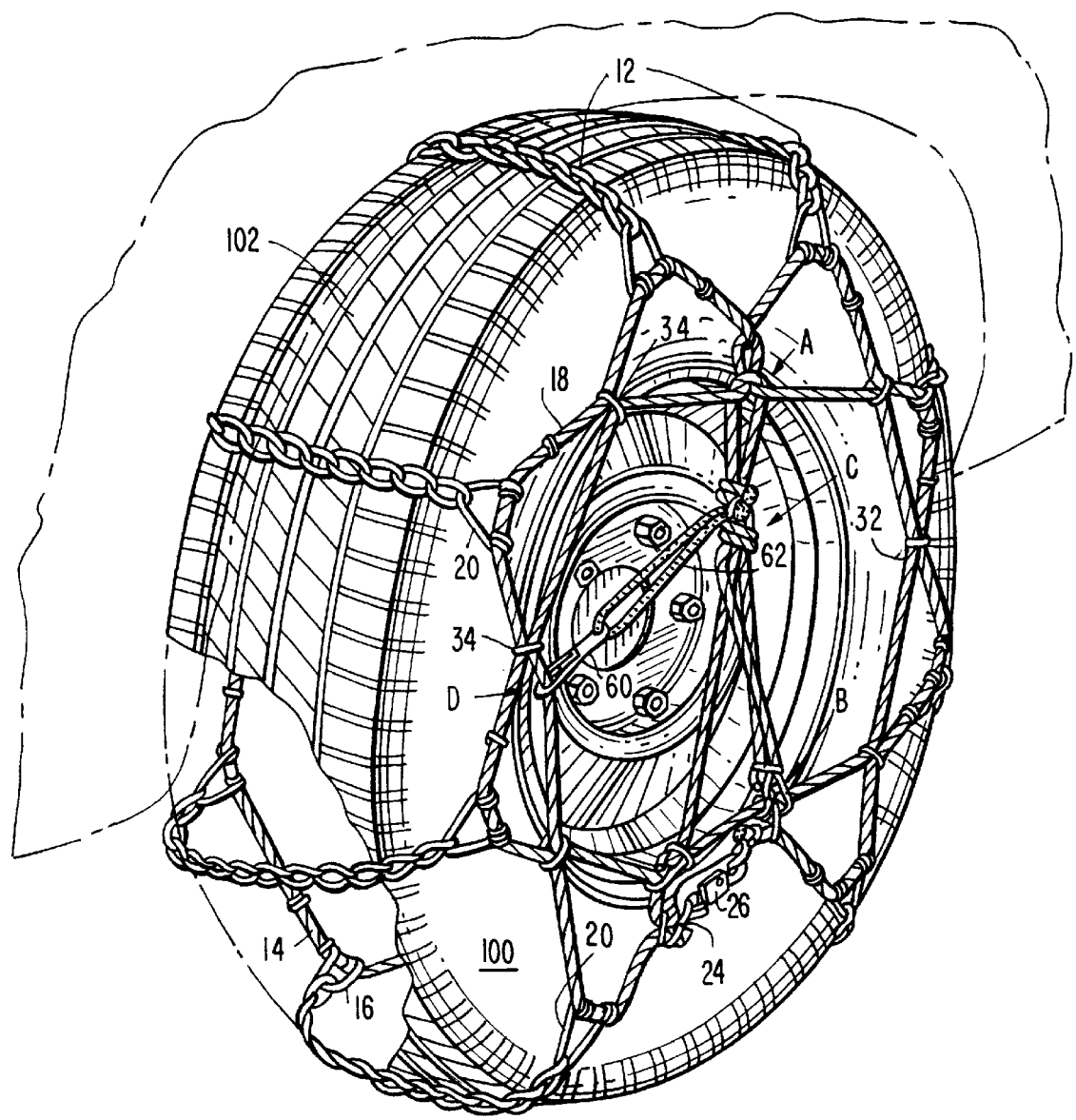
FIG. 1 is a perspective view showing the manner in which the vehicle tire chain structure is assembled upon the tire, with a portion of the tire being partially cut away to show the inboard rope connection.
Figure 2:
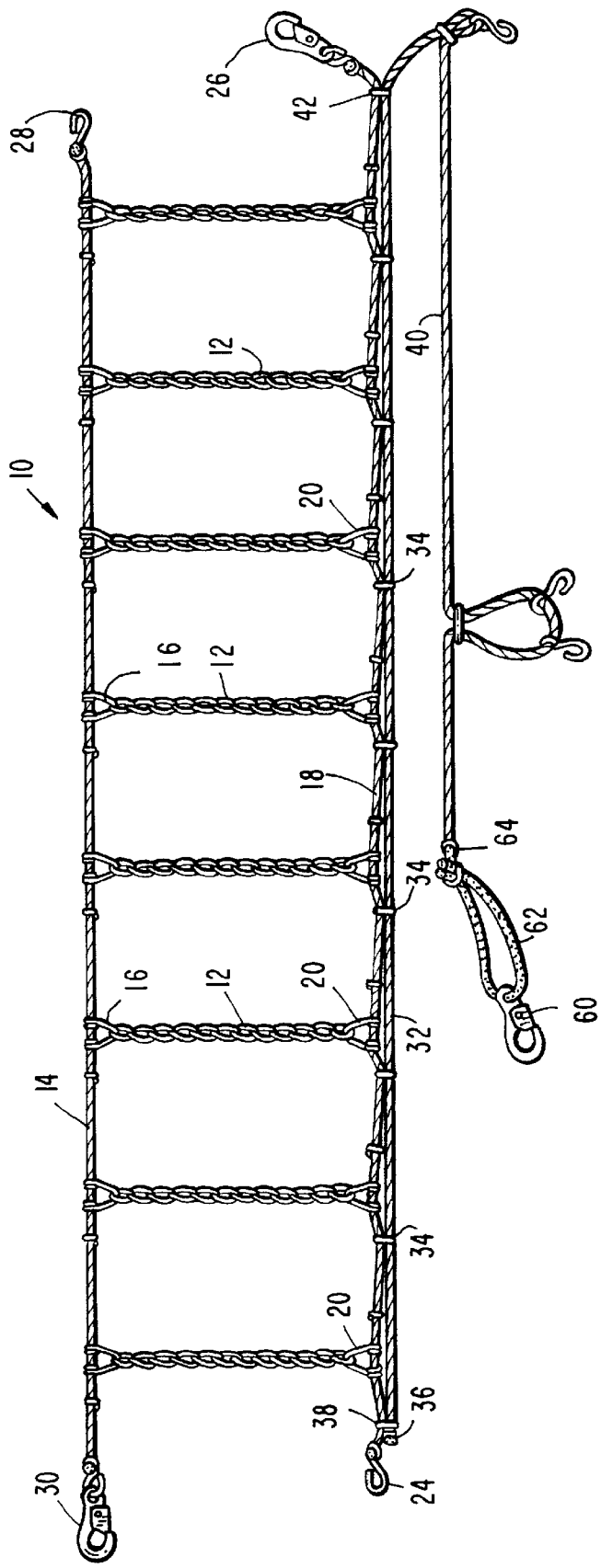
FIG. 2 is a plan view of the vehicle tire chain structure laid out on the surface prior to placement on the vehicle tire.

Referring first to FIGS. 1 and 2, the vehicle tire chain structure, generally shown as 10, is intended to be manually placed about vehicle tire 100 when inclement weather conditions require additional traction for appropriate vehicular control. The vehicle tire chain structure includes a plurality of metal cross chain 12 which are to be positioned across the tire tread 102 at arcuately spaced locations. Although eight such metal cross chains 12 are shown, it should naturally be understood that either more or less cross chains may be utilized in accordance with the range of tire size to be accommodated by the particular vehicle tire chain structure 10.

An inboard rope connector 14 is successively connected to the inboard ends of the cross chains 12 by threading through inboard end links 16 of the cross chain. Likewise, an outboard rope connector 18 is connected to the opposite ends of the metal cross chains 12 by being threaded through outboard end links 20. The threading of the outboard rope 18 through outboard end link 20 is via a partially opened loop 22 at the opposed ends of generally V-shaped connecting link 20 (see FIGS. 12 and 13). The inboard end link 16 is similarly constructed. As subsequently discussed, this permits the disengagement of end link 20 and outboard rope connector 18, (as well as end link 16 and inboard rope connector 14) when it is desired to replace a metal cross chain 12.

The outboard rope connector 18 includes releasable outboard attachment elements 24, 26 at its opposed ends. Likewise, inboard rope connector 14 includes releasable outboard attachment elements 28,30 at its opposed ends.

A spreader rope connector 32 is connected to the outboard rope connector 18 by a plurality of spreader rope connecting rings 34 each of which connects the spreader rope connector to a location on the outboard rope connector intermediate the connections of the outboard rope connector 18 and to successive cross chains 12. Thus the spreader rope connector 32 is successively connected to the outboard rope connector 18 at locations intermediate the connections of the outboard rope connector 18 to the cross chains 12, with the spreader rope connector 32 freely passing through the connecting rings 34.

A first end 36 of the spreader rope connector is fixedly secured to the outboard rope connector at a first securement point collar 38. The second, or free end section 40 of the spreader rope connector is threaded through a first securement ring 42 which is carried by the outboard rope connector at a second securement point.

The inboard, outboard and spreader ropes, 14, 18, and 32 respectively, are preferably formed of polypropylene, with different colored marker fibers extending therethrough to facilitate their appropriate connection.

Figure 3:
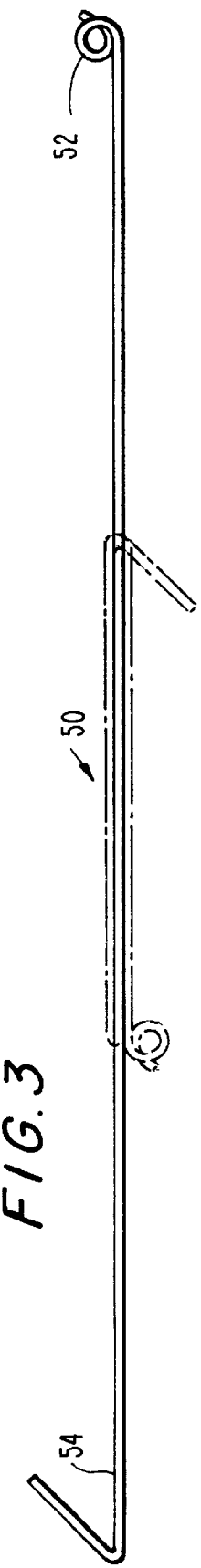
FIG. 3 is a plan view of a connecting rod which may advantageously be utilized for the connection of the inboard rope connector.
Figure 4:
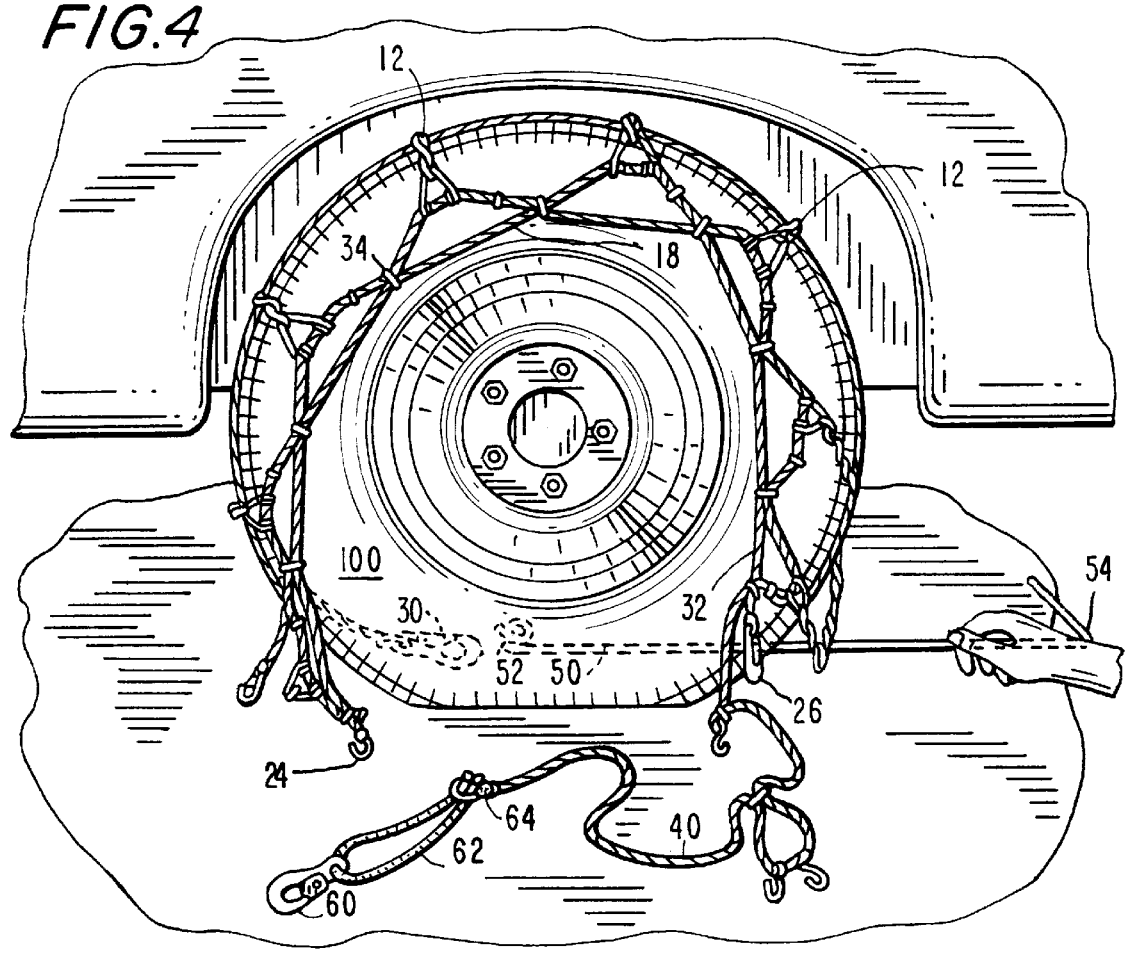
Figure 5:
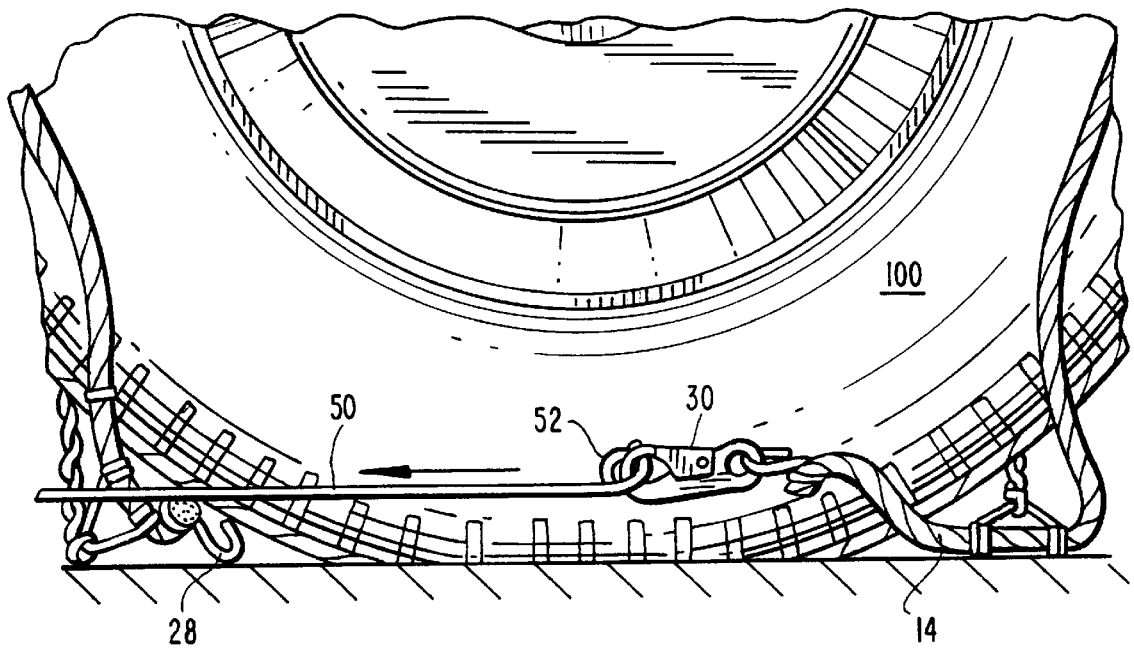
Figure 6:
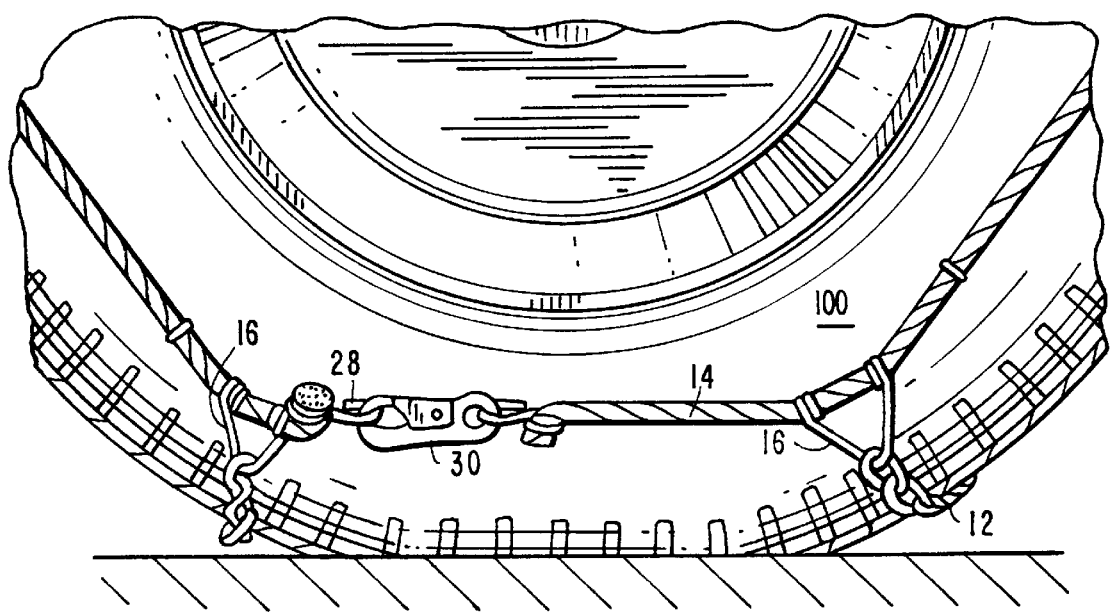

Reference is now made to FIG. 4 which shows the initial placement of the vehicle tire chain structure of the present invention on tire 100. The inboard releasable attachment elements 28 through 30 are first connected. Recognizing that these are on the inside of the tire wall, the installer must locate and grasp one of these connectors and bring it behind the tire to the opposite connector. To facilitate performance of this function, without requiring the installer to inconveniently grope behind the tire, the connecting rod 50 of FIG. 3 may be provided. Connecting rod 50 includes a closed loop 52 at one end, and a handle portion at its opposite end. Loop 52 is placed within spring-loaded connecting element 30 and the handle portion 54 is then pulled behind and across the tire towards the location of cooperative releasable attachment element 28. This is shown in FIGS. 4 and 5, with the connection between the releasable attachment elements 28,30 at the ends of the inboard rope connector 4 being completed as shown in FIG. 6.

Advantageously, the connecting rod 50, may be formed of a material, such as a soft metal, which will permit it to be bent, as shown by the dotted condition of FIG. 3, for compact storage in conjunction with chain structure.

Figure 7:
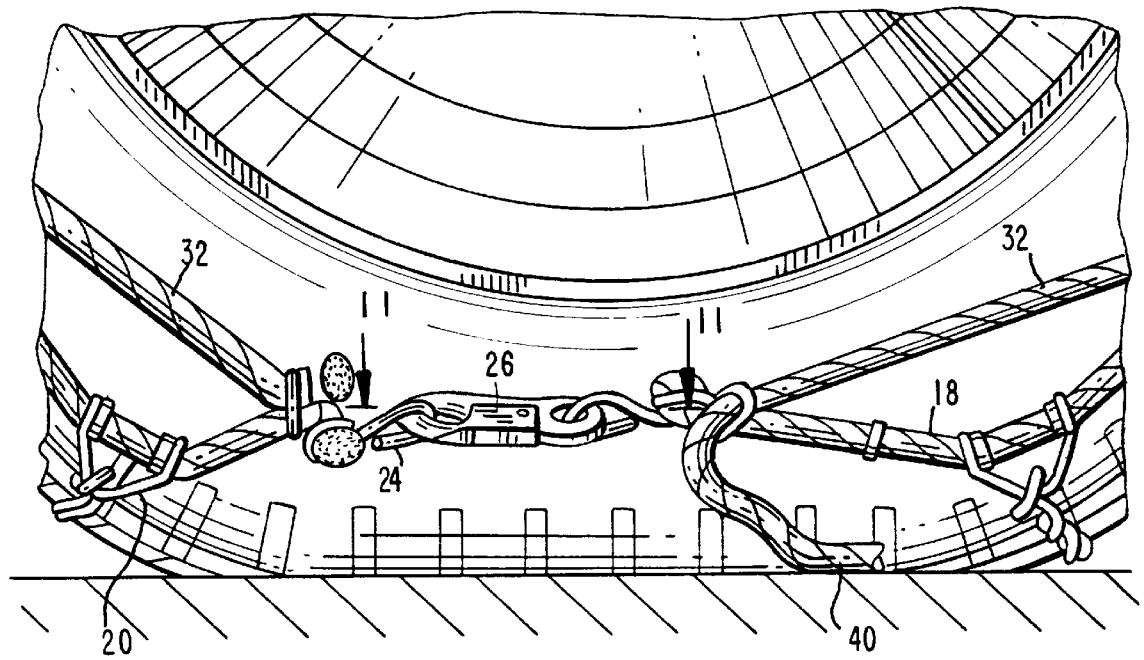

The outboard spreader rope connector releasable attachment elements 24,26 are then connected, as shown in FIG. 7.

Figure 8:
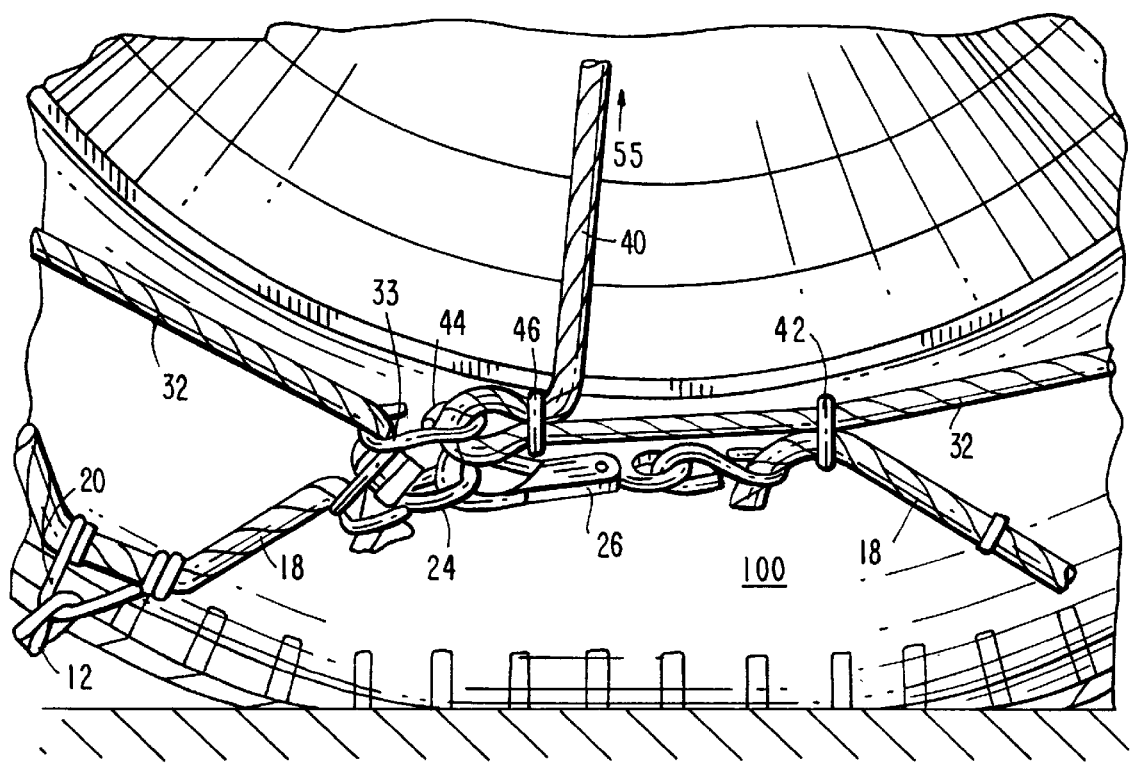

The entire assembly will now be tightened by pulling the free end portion 40 of the spreader rope connector 18 through the first securement ring 42 to a taut condition. As will subsequently be shown in FIGS. 8 through 10, this serves to urge both the outboard and inboard rope connectors and cross chains radially inward to tighten the engagement of the vehicle tire chain structure 10 on the tire 100. The initial free end portion 40 of the spreader rope 32, after passing through the first securement ring 42, includes a hook-type spreader rope connector element 44 and associated collar 46. As shown in FIG. 8, the spreader rope connector element 44 is then hooked onto the spreader rope connector at 33 such that the next successive free end portion of the spreader rope will be at the bottom region of the tire 100. Accordingly, the spreader rope will then be manually moved vertically upward, as shown by arrow 55 in FIG. 10, with the spreader rope moving through elements 42,46 for tightening the assembly, and moving inboard and outboard connector ropes 14,18 radially inward towards their final condition, as shown in FIG. 1.

Reference is made to FIGS. 9 and 10 which show the subsequent tightening and securement of the spreader rope 18. After being initially pulled vertically upward, as shown in FIG. 8, the forward end section 40 of the spreader rope is looped about the intermediate portion of the spreader rope at the vertically opposed region of the tire, as shown by "A" in FIG. 9. It is thereafter moved downward to again engage the spreader rope at the intermediate section shown by arrow "B" in FIG. 9. It should be appreciated that during this re-routing of the spreader rope connector 40, it will be manually pulled to continuously tighten the engagement of the tire chain about tire 100. The spreader rope advantageously includes an intermediate spreader rope connecting means, which comprises a pair of hooks 56,57 and collar 58.

Operationally, as the remaining free end portion 40 of the spreader rope is moved downwardly, and while it is in a taut condition, hooks 56,57 engage an intermediate section of the spreader rope 32, as shown as "B", with the collar 58 then being moved downward to retain this taut condition. The remaining free end portion 40 of the spreader rope 32 may then be appropriately wrapped around the ropes which have been previously connected to the tire. The remaining length of spreader rope 32 depends on the size of the particular tire in association with the range of tire sizes to be accommodated by the particular vehicle tire chain structure 10. As typically shown in FIG. 10, connector rope 32 will then be looped around prior generally vertical connector rope runs as generally shown by the arrow "C". Its end terminus is then connected to the spreader rope at "D". The end terminus of the spreader rope preferably includes a spring loaded connecting element 60 generally corresponding to elements 26,30 of the inboard and outboard rope connectors. Advantageously, an elastic member 62 may be inserted between connector element 60 and the end 64 of the spreader rope.

Figure 11:
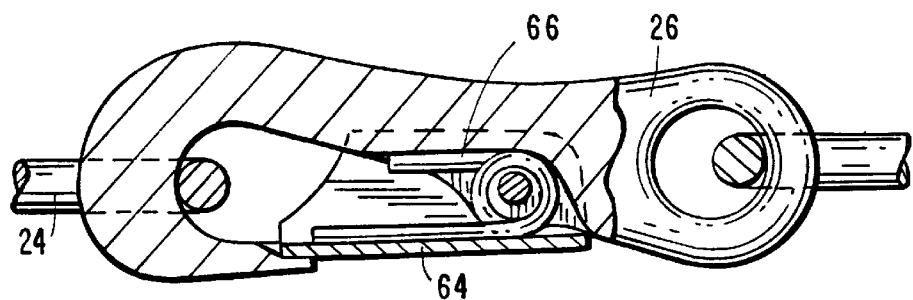
FIG. 11 is a cross section along lines 11—11 of FIG. 7, and looking in the direction of the arrow, to show the construction of the spring-loaded connector at one of the ends of the outboard rope connector - the inboard rope connector and spreader rope connector having a similar spring-loaded connector element.

Reference is now made to FIG. 11 which shows further details of the releasable spring loaded outboard rope connector element 26 of the outboard rope connector. The releasable connector 26 includes a closed loop end 61 which is connected to one end of the outboard rope connector via link 63. The connector element 26 includes an entry lever 65 which is biased to the closed condition by spring member 67. Hook-type connector element 24 at the opposite end of the outboard rope connector is inserted within the releasable outboard connector 26 against the biasing force of spring 67, with lever member 65 then preventing the inadvertent decoupling of connector elements 24,26. This is to be contrasted to prior arrangements wherein two hooks were simply engaged which had the propensity to disengage upon loosening of the assembly. Preferably, the spring-loaded connectors 30 of the inboard rope connector and 60 of the spreader rope connector are of identical construction.

Figure 12:
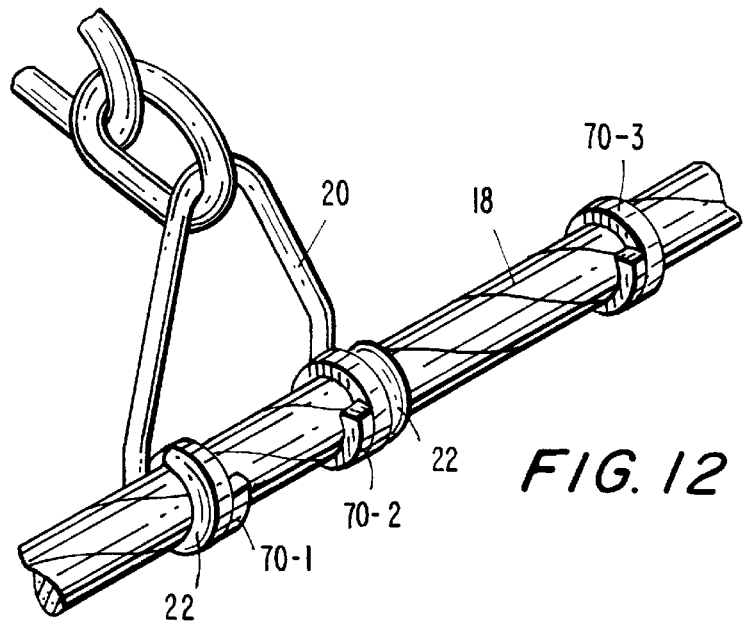
FIGS. 12 and 13 show the manner in which the inboard and outboard rope connector may be successfully shortened at each of the locations to the end links of the cross chain, for adapting the configuration of the vehicle tire chain structure to the particular tire size.
Figure 13:
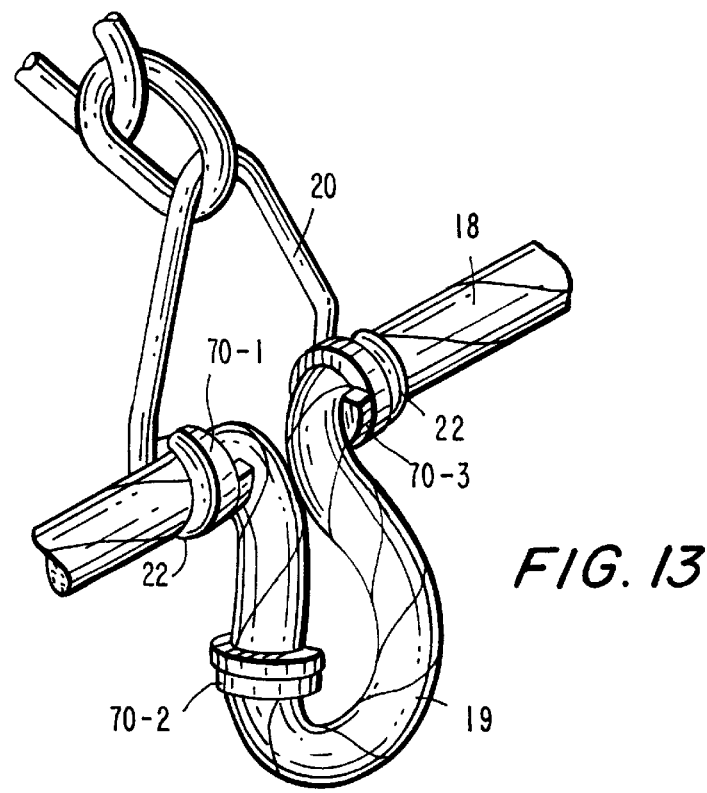

Reference is now made to FIGS. 12 and 13, showing the manner in which the inboard and/or outboard rope connectors may be shortened, in accordance with the circumference of the particular vehicle tire. While FIGS. 12 and 13 show such shortening at the outboard rope connector 18, in association with its connecting link 20, a similar structure exists in respect to the inboard rope connector 14 and its connecting link 16. FIG. 12 shows the maximum length of outboard rope connector 18 at the particular connecting link 20, whereas FIG. 13 shows a reduced length. A plurality of adjustment collars 70-1, 70-2, 70-3, are fixedly clamped to the outboard rope connector 18 at spaced locations in proximity to the connection of outboard rope connector 18 to the individual link 20. If the rope connector is to be at its maximum length, collars 70-1 and 70-2 are positioned as shown in FIG. 12. When it is desired to reduce the length of the outboard rope connector, the rope connector is slipped out of the loop 22 at the right hand side of FIG. 12, with a loop 19 being formed as collar 70-3 is now positioned as shown in FIG. 13 to retain the loop. The V-shaped end link connectors of the cross chains are preferably formed of hard tempered steel to provide a high degree of ruggedness and insure against inadvertent opening during prolonged tire chain use.

Accordingly, the present invention provides an improved quick-connect and release vehicle tire chain structure which provides increased ease of assembly and reliability of operation.

Accordingly, it should be understood that although the present invention has been described in conjunction with a specific embodiment, modifications and additions may be made thereto without departing from the scope of the present invention as defined in the appended claims.

What is claimed is:

1. A quick connect and release vehicle tire chain structure for connection to a stationary vehicle tire comprising:

a plurality of metal cross chains, having inboard and outboard ends, for positioning across the tread of a tire, at arcuately spaced locations, to enhance tire traction;

a flexible non-metallic inboard rope connector successively connected to said inboard ends of said cross chains by threading through inboard end links of each of said cross chains;

said inboard rope connector including releasable inboard attachment elements at the ends of the inboard rope connector for attaching the ends of said inboard rope connector to one another when the inboard rope connector encircles the tire;

a flexible non-metallic outboard rope connector successively connected to each of said outboard ends of said cross chains by threading through outboard end links of said cross chains;

said outboard rope connector including releasable outboard attachment elements at the ends of said outboard rope connector for attaching the ends of said outboard rope connector to one another when the outboard rope connector encircles the tire;

a spreader rope connector connected to said outboard rope connector by a flexible non-metallic plurality of spreader rope connecting rings, each of said spreader rope connecting rings connecting said spreader rope to a location on said outboard rope intermediate two successive connections of said outboard rope connector to two successive cross chains, whereby said spreader rope connector is successively connected to said outboard rope connector at locations intermediate the connections between said outboard rope connector and said cross chains;

said spreader rope connector freely passing through said spreader connecting rings;

a first end of said spreader rope connector fixedly secured to said outboard rope connector at a first securement point;

a second end section of said spreader rope connector being threaded through a first securement ring connector carried by said outboard rope connector at a second securement point;

a free end portion of said second end section of said spreader rope connector freely passing through said first securement ring; the pulling of said free end portion through said first securement ring to a taut condition while the vehicle tire is stationary urging said outboard and inboard rope connectors and cross chains radially inward to tighten the engagement of the chain structure on the tire;

the free end portion of said spreader rope connector after passing through said first securement ring including a spreader rope connecting element for connection to a first intermediate securement location of said spreader rope connector as said spreader rope is pulled to its taut condition;

said first spreader rope connecting element connection to said first intermediate securement location being at the bottom of the tire, whereby the second end section of said spreader connector rope is pulled vertically upward to its taut condition to securably install the tire chain structure while the vehicle tire is stationary.

2. A structure as claimed in claim 1, wherein each of said inboard and outboard attachment elements include a hook-type member at one end of the rope connector and a spring loaded hook retaining closure member at the other end of the rope, the closure member being manually operable against the force of its spring load for inserting the hook-type member, and thereafter automatically returning to its closure condition for positively retaining the rope ends together, until the closure member is thereafter manually operable to remove the hook-type member for defeating the attachment of the ends of the rope.

3. A structure as claimed in claim 1, wherein said spreader rope including an elastic member intermediate the second end terminus and said spreader rope connecting element.

4. A structure as set forth in claim 1, further including a connecting rod to facilitate the attachment of said inboard attachment elements to each other when the chain structure is initially placed over the tire, with the inboard rope connector positioned along the inboard side of the tire and the inboard attachment elements lie along the ground at the lower region of the tire;

said connecting rod including first and second ends, a first end adapted to engage a first of said inboard attachment elements, and the second end adapted to be manually grasped when the rod is placed along the inboard side of the tire, the first end adapted to be connected to one of the inboard rope connector attachment elements and thereafter pulled towards the other inboard rope connector element, whereby the connecting rod positions the attachment elements in proximate location for attaching the ends of the inboard rope connector.

5. A structure as claimed in claim 4, wherein said inboard attachment elements include a hook-type member at one end of the rope connector and a spring loaded hook retaining closure member at the other end of the rope, the closure member being manually operable against the force of its spring load for inserting the hook-type member, and thereafter, automatically returning to its closure condition for positively retaining the inboard rope ends together, until the closure member is thereafter manually operable to remove the hook-type member for defeating the attachment of the ends of the inboard rope.

6. A quick connect and release vehicle tire chain structure for connection to a stationary vehicle tire comprising:

a plurality of metal cross chains, having inboard and outboard ends, for positioning across the tread of a tire, at arcuately spaced locations, to enhance tire traction;

a flexible non-metallic inboard rope connector successively connected to said inboard ends of said cross chains by threading through inboard end links of each of said cross chains;

said inboard rope connector including releasable inboard attachment elements at the ends of the inboard rope connector for attaching the ends of said inboard rope connector to one another when the inboard rope connector encircles the tire;

a flexible non-metallic outboard rope connector successively connected to each of said outboard ends of said cross chains by threading through outboard end links of said cross chains;

said outboard rope connector including releasable outboard attachment elements at the ends of said outboard rope connector for attaching the ends of said outboard rope connector to one another when the outboard rope collector encircles the tire;

a flexible non-metallic spreader rope connector connected to said outboard rope connector by a plurality of spreader rope connecting rings, each of said spreader rope connecting rings connecting said spreader rope to a location on said outboard rope intermediate two successive connections of said outboard rope connector to two successive cross chains, whereby said spreader rope connector is successively connected to said outboard rope connector at locations intermediate the connections between said outboard rope connector and said cross chains;

said spreader rope connector freely passing through said spreader connecting rings;

a first end of said spreader rope connector fixedly secured to said outboard rope connector at a first securement point;

a second end section of said spreader rope connector being threaded through a first securement ring connector carried by said outboard rope connector at a second securement point;

a free end section of said second end of said spreader rope connector freely passing through said first securement ring;

the pulling of said free end portion through said first securement ring to a taut condition while the tire is stationary urging said outboard and inboard rope connectors and cross chains radially inward to tighten the engagement of the chain structure on the tire;

the free end portion of said spreader rope connector after passing through said first securement ring including a spreader rope connecting element for connection to a first intermediate securement location of said spreader rope connector when said spreader rope is pulled to its taut condition;

an intermediate spreader rope connecting means intermediate the second end terminus connection of said spreader rope and said spreader rope connecting element;

said intermediate spreader rope connecting means maintaining the portion of the spreader rope connector extending towards said first securement ring connector in a taut condition, as the portion the spreader rope between said intermediate spreader rope connector and second end terminus is pulled to increase the tension within all of said inboard, outboard and spreader rope connectors and thereby enhance the securement of said cross chains on the tire to securably install the tire chain structure while the vehicle tire is stationary.

7. A structure as claimed in claim 6, said intermediate spreader rope connecting means including at least one dual hook and securement ring carried by said spreader rope, one end of said dual hook threadably attached to said spreader rope and the other end of said dual hook adapted to be connected to a preceding section of the spreader rope closer to its first end, said securement ring sliding over the portion of the spreader rope on either side of the dual hook first end when its other end is connected to a preceding section of the spreader rope, thereby maintaining the portion of said dual hook on said spreader rope.

8. A structure as claimed in claim 7, wherein said intermediate spreader rope connecting means includes a pair of proximate dual hooks threadably attached to said spreader rope, the other ends of said hooks adapted to engage a preceding section of the spreader rope on either side of a spreader rope connecting ring which connects said spreader rope to said outboard rope.

9. A structure as claimed in claim 8, said proximate dual hooks are adapted to engage the spreader rope connector ring which connects said spreader rope to one end of said outboard rope connectors.

10. A structure as claimed in claim 7, wherein said spreader rope including an elastic member intermediate the second end and spreader rope connecting element of said spreader rope.

11. A structure as claimed in claim 8, wherein said spreader rope including an elastic member intermediate the second end and spreader rope connecting element of said spreader rope.

12. A structure as claimed in claim 6, wherein said spreader rope connecting element connection to said first intermediate securement location being at the bottom of the tire, whereby the second end section of said spreader connector rope is pulled vertically upward to its taut condition.

13. A structure as claimed in claim 12, wherein said spreader rope including an elastic member intermediate the second end and spreader rope connecting element of said spreader rope;

said intermediate spreader rope connecting means including at least one dual hook and securement ring carried by said spreader rope, one end of said dual hook threadably attached to said spreader rope and the other end of said dual hook adapted to be connected to a preceding section of the spreader rope closer to its first end, said securement ring sliding over the portion of the spreader rope on either side of the dual hook first end when its other end is connected to a preceding section of the spreader rope, thereby maintaining the portion of said dual hook on said spreader rope.

14. A structure as claimed in claim 12, wherein said intermediate spreader rope connecting means includes a pair of proximate dual hooks threadably attached to said spreader rope, the other ends of said hooks adapted to engage a preceding section of the spreader rope on either side of a spreader rope connecting ring which connects said spreader rope to said outboard rope.

15. A quick connect and release vehicle tire chain structure for connection to a stationary vehicle tire comprising:

a plurality of metal cross chains, having inboard and outboard ends, for positioning across the tread of a tire, at arcuately spaced locations, to enhance tire traction;

a flexible non-metallic inboard rope connector successively connected to said inboard ends of said cross chains by threading through inboard end links of each of said cross chains;

said inboard rope connector including releasable inboard attachment elements at the ends of the inboard rope connector for attaching the ends of said inboard rope connector to one another when the inboard rope connector encircles the tire;

a flexible non-metallic outboard rope connector successively connected to each of said outboard ends of said cross chains by threading through outboard end links of said cross chains;

said outboard rope connector including releasable outboard attachment elements at the ends of said outboard rope connector for attaching the ends of said outboard rope connector to one another when the outboard rope connector encircles the tire;

a flexible non-metallic spreader rope connector connected to said outboard rope connector by a plurality of spreader rope connecting rings, each of said spreader rope connecting rings connecting said spreader rope to a location on said outboard rope intermediate two successive connections of said outboard rope connector to two successive cross chains, whereby said spreader rope connector is successively connected to said outboard rope connector at locations intermediate the connections between said outboard rope connector and said cross chains;

said spreader rope connector freely passing through said spreader connecting rings;

a first end of said spreader rope connector fixedly secured to said outboard rope connector at a first securement point;

a second end section of said spreader rope connector being threaded through a first securement ring connector carried by said outboard rope connector at a second securement point;

a free end section of said second end of said spreader rope connector freely passing through said first securement ring;

the pulling of said free end portion through said first securement ring to a taut condition urging said outboard and inboard rope connectors and cross chains radially inward to tighten the engagement of the chain structure on the tire to securably install the tire chain structure while the vehicle tire is stationary;

the second end terminus of said spreader rope connector including a spreader rope connecting element for connection to a first intermediate securement location of said spreader rope connector when said spreader rope is pulled to its taut condition.

16. In a quick connect and release vehicle tire chain structure for connection to a stationary vehicle tire comprising:

a plurality of metal cross chains, having inboard and outboard ends, for positioning across the tread of a tire, at arcuately spaced locations, to enhance tire traction;

a flexible non-metallic inboard rope connector successively connected to said inboard ends of said cross chains by threading through inboard end links of each of said cross chains;

said inboard rope connector including releasable inboard attachment elements at the ends of the inboard rope connector to one another when the inboard rope connector encircles the tire;

a flexible non-metallic outboard rope connector successively connected to each of said outboard ends of said cross chains by threading through outboard end links of said cross chains;

said outboard rope connector including releasable outboard attachment elements at the ends of said outboard rope connector for attaching the ends of said outboard rope connector to one another when the outboard rope connector encircles the tire;

a flexible non-metallic spreader rope connector connected to said outboard rope connector by a plurality of spreader rope connecting rings, each of said spreader rope connecting rings connecting said spreader rope to a location on said outboard rope intermediate two successive connections of said outboard rope connector to two successive cross chains, whereby said spreader rope connector is successively connected to said outboard rope connector at locations intermediate the connections between said outboard rope connector and said cross chains;

said spreader rope connector freely passing through said spreader connecting rings;

a first end of said spreader rope connector fixedly secured to said outboard rope connector at a first securement point;

a second end section of said spreader rope connector being threaded through a first securement ring connector carried by said outboard rope connector at a second securement point;

a free end portion of said second end of said spreader rope connector freely passing through said first securement ring;

the pulling of said free end portion through said first securement ring to a taut condition urging said outboard and inboard rope connectors and cross chains radially inward to tighten the engagement of the chain structure on the tire to securably install the tire chain structure while the vehicle tire is stationary;

the free end portion terminus of said spreader rope connector including a spreader rope connecting element for connection to a first intermediate securement location of said spreader rope connector as said spreader rope is pulled to its taut condition;

a combined rope to cross chain connecting link and rope connector adjustment device provided at each end of each cross chain for connection to said inboard and outboard rope connectors;

each of said connecting links comprising a substantially V-shaped member with a loop formed at each end of the V;

said V-shaped member connected to the associated cross chain end by passing the cross chain end link at the bottom of the V;

said loops each being engaged with the associated one of said rope connectors by at least partially surrounding the rope connector;

both of said loops being dimensioned and arranged to partially surround and slidably engage said rope;

each of said slidably engaged loops being open sufficiently to permit the rope to be slipped out of and into said loop;

an adjustment collar means clamped to said rope in the vicinity of each of said connecting links;

said collar adjustment means being sufficiently large to prevent the portion of the rope to which the collar is clamped from sliding through at least one of said slidably engaged loops, to prevent longitudinal movement of said rope with respect to said link when the section of rope between said loops contains said adjustment collar means;

the improvement comprising:

forming said adjustment collar means as loops which are clamped to their respective ropes over a length which exceeds 360 degrees to provide an overlapped length beyond the butt juncture of their ends.

17. In the combination as set forth in claim 16, said V-shaped member being formed of tempered steel.

18. In the combination as set forth in claim 16, said adjustment collar means including:

a set of at least three collars clamped to said rope at spaced positions upon said rope in the vicinity of each of said connecting links with at least two of the three collars positioned between the loops of the associated connecting link;

one of the outer ones of said collars and the middle one of said collars being spaced apart to respectively fit between said loops and to fit in closely spaced relationship to the inner sides of said two loops to prevent longitudinal movement of said rope with respect to said link when the section of rope between said loops is straight, the other outer one of said collars being operable when positioned inside the adjacent loop of and link in conjunction with the positioning of the first outer collar inside the other loop to shorten the rope by forming a loop of rope between said loops of said link.

19. In the combination as set forth in claim 16, further including:

an intermediate spreader rope connecting means intermediate the second end terminus connection of said spreader rope and said spreader rope connecting element;

said intermediate spreader rope connecting means maintaining the portion of the spreader rope connector extending towards said first securement ring connector in a taut condition, as the portion the spreader rope between said intermediate spreader rope connector and second end terminus is pulled to increase the tension within all of said inboard, outboard and spreader rope connectors and thereby enhance the securement of said cross chains on the tire.

20. In the combination as set forth in claim 19, said intermediate spreader rope connecting means including at least one dual hook and securement ring carried by said spreader rope, one end of said dual hook threadably attached to said spreader rope and the other end of said dual hook adapted to be connected to a preceding section of the spreader rope closer to its first end, said securement ring sliding over the portion of the spreader rope on either side of the dual hook first end when its other end is connected to a preceding section of the spreader rope, thereby maintaining the portion of said dual hook on said spreader rope.

21. A structure as claimed in claim 1, wherein at least one of said flexible rope connectors is formed of polystyrene fibers.

22. A structure as claimed in claim 1 where all of said inboard, outboard and spreader rope connectors are formed of polypropylene fibers.

* * * * *